United States Patent
Nakano et al.

(10) Patent No.: US 9,421,847 B2
(45) Date of Patent: Aug. 23, 2016

(54) VEHICLE-COOLING-FAN CONTROL SYSTEM AND CONTROL METHOD THEREFOR

(71) Applicant: Mitsubishi Heavy Industries Automotive Thermal Systems Co., Ltd., Kiyosu-shi, Aichi (JP)

(72) Inventors: Koji Nakano, Tokyo (JP); Hiroyuki Kamitani, Kiyosu (JP); Atsushi Suzuki, Kiyosu (JP)

(73) Assignee: MITSUBISHI HEAVY INDUSTRIES AUTOMOTIVE THERMAL SYSTEMS CO., LTD., Aichi (JP)

(*) Notice: Subject to any disclaimer, the term of this patent is extended or adjusted under 35 U.S.C. 154(b) by 0 days.

(21) Appl. No.: 14/760,606

(22) PCT Filed: Oct. 29, 2013

(86) PCT No.: PCT/JP2013/079303
§ 371 (c)(1),
(2) Date: Jul. 13, 2015

(87) PCT Pub. No.: WO2014/129019
PCT Pub. Date: Aug. 28, 2014

(65) Prior Publication Data
US 2015/0360540 A1    Dec. 17, 2015

(30) Foreign Application Priority Data
Feb. 21, 2013  (JP) .................... 2013-032187

(51) Int. Cl.
*B60H 1/00*     (2006.01)
*B60R 16/023*   (2006.01)
(Continued)

(52) U.S. Cl.
CPC ...... *B60H 1/00828* (2013.01); *B60H 1/00978* (2013.01); *B60H 1/12* (2013.01);
(Continued)

(58) Field of Classification Search
CPC ..................... B60H 1/00828; B60R 16/023

USPC ........................................... 701/36
See application file for complete search history.

(56) References Cited

U.S. PATENT DOCUMENTS

| | | | | |
|---|---|---|---|---|
| 2006/0120903 | A1* | 6/2006 | Iwasaki et al. | F01P 7/048 417/423.1 |
| 2007/0124574 | A1* | 5/2007 | Goldberg | G06F 1/206 713/100 |

(Continued)

FOREIGN PATENT DOCUMENTS

| | | |
|---|---|---|
| CN | 101652544 A | 2/2010 |
| JP | 2005-080384 A | 3/2005 |
| JP | 2005-299407 A | 10/2005 |

OTHER PUBLICATIONS

Chinese Office Action issued May 30, 2016 in corresponding Chinese Application No. 201380071765.8 with an English translation.

*Primary Examiner* — Fadey Jabr
*Assistant Examiner* — Yazan A Soofi
(74) *Attorney, Agent, or Firm* — Birch, Stewart, Kolasch & Birch, LLP

(57) ABSTRACT

A fault in a fan motor is detected on the vehicle side with simple wiring. Provided is a vehicle-cooling-fan control system including a fan control unit having a motor control unit that controls a three-phase motor for driving a cooling fan, a vehicle-side ECU that is provided superordinate to the fan control unit and that controls a vehicle, and an air-conditioning-system ECU that controls an air-conditioning apparatus of the vehicle, wherein the fan control unit, the vehicle-side ECU, and the air-conditioning-system ECU are connected so that information can be transferred therebetween via a vehicle network CAN, the fan control unit outputs fault information via a CAN driver in the case where a fault has been detected at a switching device, and the vehicle-side ECU exercises control via the vehicle network CAN to protect the fan control unit and the air-conditioning-system ECU in the case where the importance of the fault information is high.

5 Claims, 4 Drawing Sheets

(51) Int. Cl.
F01P 11/14 (2006.01)
F04D 27/00 (2006.01)
F01P 5/04 (2006.01)
B60H 1/12 (2006.01)
F01P 7/04 (2006.01)
F04D 25/08 (2006.01)

(52) U.S. Cl.
CPC ............ *B60R 16/023* (2013.01); *F01P 5/04* (2013.01); *F01P 7/04* (2013.01); *F01P 11/14* (2013.01); *F04D 27/004* (2013.01); *F04D 27/008* (2013.01); *F01P 2031/36* (2013.01); *F04D 25/08* (2013.01)

(56) References Cited

U.S. PATENT DOCUMENTS

2007/0181356 A1  8/2007  Ando et al.
2013/0147407 A1* 6/2013  Kawamura ........ H03K 17/0828
                                                    318/400.21

* cited by examiner

VEHICLE-COOLING-FAN CONTROL SYSTEM AND CONTROL METHOD THEREFOR

TECHNICAL FIELD

The present invention relates to a vehicle-cooling-fan control system and a control method therefor.

BACKGROUND ART

A fan control unit that controls a cooling fan of an on-board heat exchanger is provided under the control of a vehicle ECU (Electronic Control Unit), and the cooling fan is controlled by controlling the rotation speed of a motor thereof according to the duty ratio of a PWM (pulse width modulation) signal that is output from the vehicle ECU.

The rotation speed of the motor is controlled based on the vehicle speed, the temperature of the coolant for the engine, and the AC pressure. In the case where the air conditioner is ON, the air-conditioning ECU calculates the necessary fan control and outputs the result to the vehicle ECU based on a pressure signal of the air conditioner and a vehicle speed signal received from the vehicle side. The vehicle ECU determines the rotation speed for the fan motor in consideration of the vehicle speed and the temperature of the coolant for the engine in addition to the signal and outputs a fan-driving PWM signal. In the case where the air conditioner is OFF, the vehicle ECU determines the rotation speed of the fan based on the vehicle speed and the temperature of the coolant for the engine and outputs a fan-driving PWM signal.

SUMMARY OF INVENTION

Technical Problem

In the vehicle system configuration described above, even in the case where a fault has occurred at the fan motor for driving the cooling fan, a PWM signal is just sent unidirectionally from the vehicle ECU to the fan control unit side, and no communication means is provided between the fan control unit side and the vehicle ECU, which results in the problem that it is not possible to discover a fault at the fan motor from the vehicle side. Furthermore, since the vehicle ECU and the fan control unit are connected to each other via individual harnesses, which makes the vehicle's internal wiring complex, it is difficult to report a fault occurring on the fan control unit side to the vehicle side.

It is an object of the present invention to provide a vehicle-cooling-fan control system and a control method therefor with which it is possible to detect a fault in a fan motor from the vehicle side with simple wiring.

Solution to Problem

A first aspect of the present invention is a vehicle-cooling-fan control system including a fan control unit having a motor control unit that controls a three-phase motor for driving a cooling fan to supply air to an on-board heat exchanger, a first control unit that is provided superordinate to the fan control unit and that controls a vehicle, and a second control unit that controls an air-conditioning apparatus of the vehicle, wherein the fan control unit, the first control unit, and the second control unit are connected to each other via a vehicle network so as to allow transfer of information therebetween, wherein the fan control unit outputs fault information via the vehicle network in a case where a fault has been detected at a switching device provided in the motor control unit, and wherein the first control unit exercises control via the vehicle network to protect the fan control unit and the second control unit in a case where the obtained fault information indicates a fault having a high importance.

For example, the switching device is a power transistor implemented by a semiconductor device, and a MOSFET (Metal-Oxide-Semiconductor Field-Effect Transistor), a bipolar transistor, an IGBT (Insulated Gate Bipolar Transistor), etc. is used. As the semiconductor material, an Si (silicon)-based semiconductor or an SiC (silicon carbide)-based semiconductor is used.

According to the first aspect of the present invention, since the fault information of the three-phase motor is reported to the vehicle side via the vehicle network, it is possible to detect, from the vehicle side, a fault in the three-phase motor for driving the cooling fan. In the case where a fault having a high importance has occurred, the vehicle-side control unit (first control unit) exercises control to protect the second control unit that controls the air-conditioning apparatus and the motor control unit. This makes it possible to prevent serious accidents and makes it easier to investigate the cause of the fault. Here, fault information having a high importance refers to information indicating a fault that may cause damage to humans, for example, a fault involving the danger of causing a fire or an electric shock, such as insulation failure, disconnection, or short-circuit breakdown of the three-phase motor, which frequently cause an overcurrent.

Furthermore, the fan control unit, the first control unit, and the second control unit are connected to each other so that information can be transferred therebetween via the vehicle network. Thus, with the fan control unit, finer and quicker response can be expected compared with the conventional rotation-speed control based on PWM control. Accordingly, it is possible to control the air-conditioning apparatus precisely in accordance with the state of the three-phase motor, which enables comfortable and delicate air-conditioning control.

Preferably, the second control unit which is applied to the above vehicle-cooling-fan control system is configured such that the fan control unit is controlled via the vehicle network in a case where the second control unit is in the normal state, in which no serious fault has been detected.

With this configuration, a load is not imposed on the vehicle-side superordinate system or the communication system, such as a CAN, in the normal state.

In the above vehicle-cooling-fan control system, the fan control unit and the second control unit may be connected to each other via a communication network for transferring PWM (pulse width modulation) signals for controlling the switching device in the fan control unit in response to a duty, the fan control unit may include a PWM controller for controlling the switching device of the motor control unit via the communication network based on PWM control and a communication controller for sending and receiving information via the vehicle network, and the fan control unit may obtain a rotation-speed instruction for the three-phase motor via at least one of the PWM controller and the communication controller.

Since the fan control unit can obtain the rotation-speed instruction both via the communication network and via the vehicle network, the fan control unit can work with both the conventional PWM-duty-based control and the recent mainstream type of control using a vehicle network (e.g., CAN (Controller Area Network) communication, LIN (Local Interconnect Network) communication, etc.).

A second aspect of the present invention is a control method for a vehicle-cooling-fan control system, the control system including a fan control unit having a motor control unit that controls a three-phase motor for driving a cooling fan to supply air to an on-board heat exchanger, a first control unit that is provided superordinate to the fan control unit and that controls a vehicle, and a second control unit that controls an air-conditioning apparatus of the vehicle, wherein, in a case where the fan control unit, the first control unit, and the second control unit are connected to each other via a vehicle network so as to allow transfer of information therebetween, fault information is output from the motor control unit via the vehicle network in a case where a fault has been detected at a switching device provided in the motor control unit, and the first control unit exercises control via the vehicle network to protect the fan control unit and the second control unit in a case where the fault information indicates a fault having a high importance.

Advantageous Effects of Invention

According to the present invention, an advantage is afforded in that it is possible to detect a fault in a fan motor from the vehicle side with simple wiring.

DESCRIPTION OF EMBODIMENTS

An embodiment of a vehicle-cooling-fan control system and a control method therefor according to the present invention will be described below with reference to the drawings. The description will be given in the context of an example where a fan control unit of the vehicle-cooling-fan control system in this embodiment is used to control a motor that drives a cooling fan for a heat exchanger (radiator) of a vehicle.

First Embodiment

Figure 1:
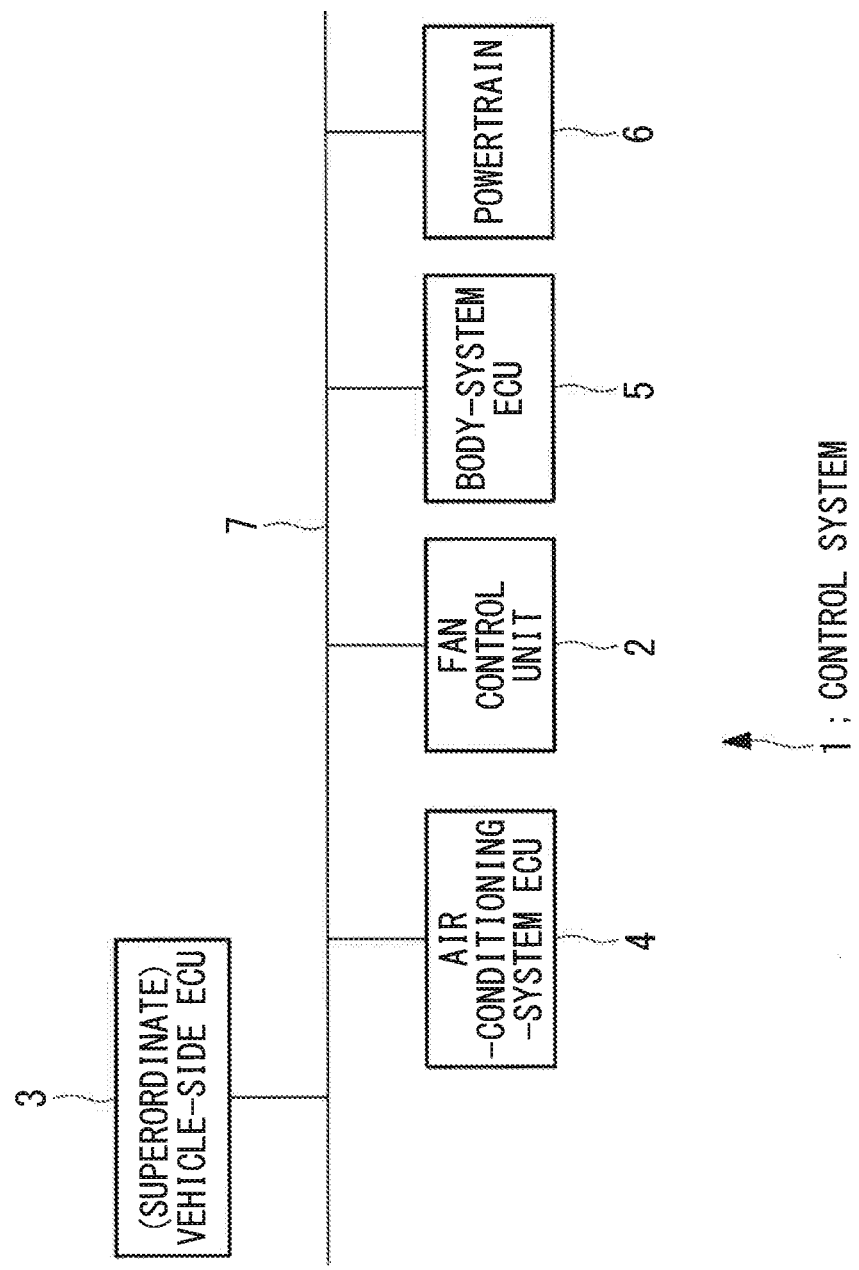
FIG. 1 is a schematic configuration diagram of a vehicle-cooling-fan control system according to a first embodiment of the present invention.

FIG. 1 is a schematic diagram showing the configuration of a control system (vehicle-cooling-fan control system) 1 according to this embodiment.

As shown in FIG. 1, the control system 1 includes a fan control unit 2 having a motor control unit that controls a three-phase motor for driving the cooling fan to supply air to the radiator, a vehicle-side ECU (first control unit) 3 that controls the vehicle, which is provided superordinate to the fan control unit 2, an air-conditioning-system ECU (second control unit) 4 that controls an air-conditioning apparatus of the vehicle, a body-system ECU 5 that controls the body system, such as the interior thereof, and a powertrain 6 that transmits the energy generated by the engine to the drive wheels. It will be understood that the present invention is also applicable to systems where vehicle components other than those shown in FIG. 1 are connected to the vehicle network.

In the control system 1, the fan control unit 2, the vehicle-side ECU 3, the air-conditioning-system ECU 4, the body-system ECU 5, and the powertrain 6 are connected such that information can be mutually sent and received via a vehicle network CAN 7.

Although this embodiment will be described in the context of an example where a CAN is used as a vehicle network, without limitation thereto, other types of network, such as LIN or FlexRay, may be used, and there is no particular limitation.

Figure 2:
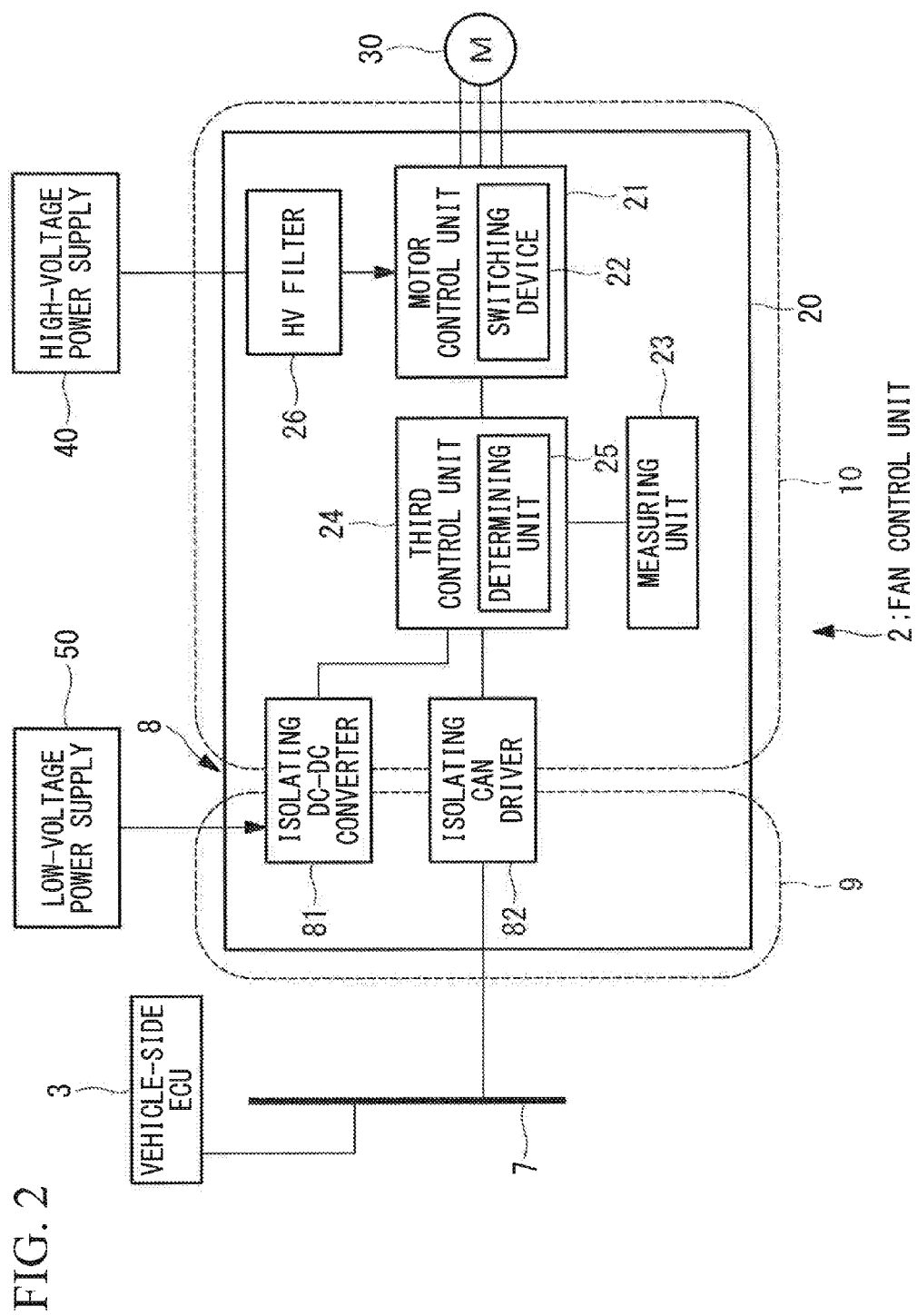
FIG. 2 is a functional block diagram of a fan control unit according to the first embodiment of the present invention.

FIG. 2 is a functional block diagram of the fan control unit 2 according to this embodiment.

The fan control unit 2 includes a three-phase motor 30 and an inverter system 20 that drives the three-phase motor 30.

The inverter system 20 includes a motor control unit 21 having a switching device 22, a measuring unit 23, a third control unit 24, and an isolating unit 8. The motor control unit 21 converts a direct current supplied from a high-voltage power supply 40, such as a high-voltage battery or a generator, into a three-phase alternating current and drives the three-phase motor 30. The high-voltage power supply 40 has a voltage of, for example, 200 [V] or 400 [V], and supplies electric power to the motor control unit 21 via an HV filter 26. A low-voltage power supply 50 is an on-board battery power supply, etc., and supplies a voltage of, for example, 12 [V].

Here, the switching device 22 is a power transistor implemented by a semiconductor device. For example, a MOSFET, a bipolar transistor, an IGBT, etc. is used. As the semiconductor material, an Si-based semiconductor or an SiC-based semiconductor is used.

The isolating unit 8 provides electrical isolation between a low-voltage system 9, to which electric power is supplied from the low-voltage power supply 50, and a high-voltage system 10, to which electric power is supplied from the high-voltage power supply 40. Furthermore, the isolating unit 8 operates by using electric power supplied from the low-voltage power supply 50, and specifically it includes an isolating DC-DC converter 81 and an isolating CAN driver (communication controller) 82.

The isolating DC-DC converter 81 supplies electric power received from the low-voltage power supply 50 to the motor control unit 21 and the third control unit 24. The electric power supplied by the isolating DC-DC converter 81 is also used as the driving voltage for the third control unit 24 (e.g., 5 [V]) and the driving voltage for the motor control unit 21 (e.g., 15 [V]).

The isolating CAN driver 82 is connected to the vehicle network CAN 7 and is connected to the vehicle-side ECU 3 via the vehicle network CAN 7 so that information can be transferred between the vehicle-side ECU 3 and the third control unit 24.

The fan control unit 2 outputs fault information via the CAN driver 82 connected to the vehicle network CAN 7 in the case where a fault has been detected at the switching device 22 in the motor control unit 21.

In the case where the fault information indicates a fault having a high importance, the vehicle-side ECU 3 exercises control via the vehicle network CAN 7 to protect the fan control unit 2 and the air-conditioning-system ECU 4. Here, fault information having a high importance refers to information indicating a fault that may cause damage to humans, for example, a fault involving the danger of causing a fire or an electric shock, such as insulation failure, disconnection, or short-circuit breakdown of the three-phase motor, which frequently cause an overcurrent at the switching device 22.

In the normal state, i.e., in the case where no serious fault has been detected, the air-conditioning-system ECU 4 controls the fan control unit 2 via the vehicle network CAN 7. Thus, in the normal state, a load is not imposed on the vehicle-side superordinate system or the communication system such as a CAN.

The third control unit 24 controls the motor control unit 21. Specifically, the third control unit 24 obtains a rotation-speed instruction for the three-phase motor 30 via the CAN driver 82 and controls the three-phase motor 30 based on the obtained rotation-speed instruction.

The third control unit 24 includes a determining unit 25. The determining unit 25 determines whether a fault has occurred at the switching device 22 based on at least one of a temperature value, a current value, and a voltage value obtained from the measuring unit 23. Specifically, the determining unit 25 has thresholds for the temperature value, the current value, and the voltage value, and in the case where one of the predetermined thresholds is exceeded, the determining unit 25 determines that the fault has a high importance and outputs the determination result to the vehicle-side ECU 3 via the vehicle network CAN 7. The thresholds provided in the determining unit 25 are not limited to values for the temperature, the current, and the voltage per se and may be defined in terms of the number of times that those values are detected repeatedly.

Furthermore, in the case where a fault having a high importance has been detected at the switching device 22, the third control unit 24 outputs fault information via the CAN driver 82 to the vehicle-side ECU 3 to report that a fault has occurred in the control of the three-phase motor 30.

The measuring unit 23 measures at least one of the temperature value, the current value, and the voltage value of the switching device 22 of the motor control unit 21 and outputs the result to the third control unit 24. For example, in the case where the three-phase motor 30 or the switching device 22 of the motor control unit 21 is experiencing failure, the temperature of the switching device 22 becomes high. Thus, the measuring unit 23 detects a change in the temperature of the switching device 22, and the third control unit 24 determines whether a failure has occurred.

Next, the operation of the control system 1 according to this embodiment will be described.

The DC electric power supplied to the motor control unit 21 from the high-voltage power supply 40 installed in the vehicle is converted into a three-phase alternating current, and the three-phase alternating current is supplied to the three-phase motor 30 to drive the three-phase motor 30. The motor control unit 21 is controlled based on a rotation-speed instruction for the three-phase motor 30, obtained via the CAN driver 82 from the vehicle-side ECU 3 provided on the vehicle side. Accordingly, the three-phase motor 30 is driven to rotate, whereby the cooling fan for the radiator operates.

The temperature value, the current value, and the voltage value of the switching device 22 are measured, and the measurement results are output to the third control unit 24. The measurement results are compared with the predetermined thresholds, and in the case where the thresholds are not exceeded, i.e., in the case of the normal state, the air-conditioning-system ECU 4 controls the fan control unit 2. On the other hand, in the case where the measurement results exceed the predetermined thresholds, the fault is determined as having a high importance, and fault information is reported to the vehicle-side ECU 3 via the vehicle network CAN 7.

At the vehicle-side ECU 3, which is a control circuit on the vehicle side, when the fault information is obtained from the fan control unit 2 via the vehicle network CAN 7, it is detected that a fault has occurred at the cooling fan for the radiator. It is possible to make the driver of the vehicle become aware of the fault by presenting the occurrence of the fault in the cooling fan for the radiator via a presenting unit (not shown), etc.

Furthermore, upon detecting the fault information, the vehicle-side ECU 3 exercises control to protect the whole vehicle, including the air-conditioning-system ECU 4, the fan control unit 2, the body-system ECU 5, and the powertrain 6. This makes it possible to prevent serious accidents resulting from the fault information.

As described above, in the control system 1 and the control method therefor according to this embodiment, the fan control unit 2 including the motor control unit 21 that controls the three-phase motor 30 for driving the on-board cooling fan for the radiator, the vehicle-side ECU 3 provided superordinate to the fan control unit 2, and the air-conditioning-system ECU 4 that controls the air-conditioning apparatus of the vehicle are connected to each other via the vehicle network CAN 7 so that information can be transferred therebetween. In the case where a fault has been detected at the switching device 22 provided in the motor control unit 21, the motor control unit 21 outputs fault information via the vehicle network CAN 7. Having obtained the fault information, in the case where the fault information indicates a fault having a high importance, the vehicle-side ECU 3 exercises control via the vehicle network CAN 7 to protect the fan control unit 2 and the air-conditioning-system ECU 4.

Thus, the fault information of the three-phase motor 30 is reported to the vehicle side via the vehicle network CAN 7. This makes it possible to detect a fault in the three-phase motor 30 driving the cooling fan on the vehicle side. In the case where a fault having a high importance has occurred, the vehicle-side ECU 3 exercises control to protect the air-conditioning-system ECU 4 and the motor control unit 21. This makes it possible to prevent serious accidents and makes it easier to investigate the cause of the fault.

Furthermore, the fan control unit 2, the vehicle-side ECU 3, and the air-conditioning-system ECU 4 are connected to each other so that information can be transferred therebetween via the CAN (vehicle network) 7. Thus, finer and quicker response can be expected compared with the conventional rotation-speed control based on PWM control. Accordingly, it is possible to control the air-conditioning apparatus precisely in accordance with the state of the three-phase motor 30, which enables comfortable and delicate air-conditioning control.

Modification

Figure 3:
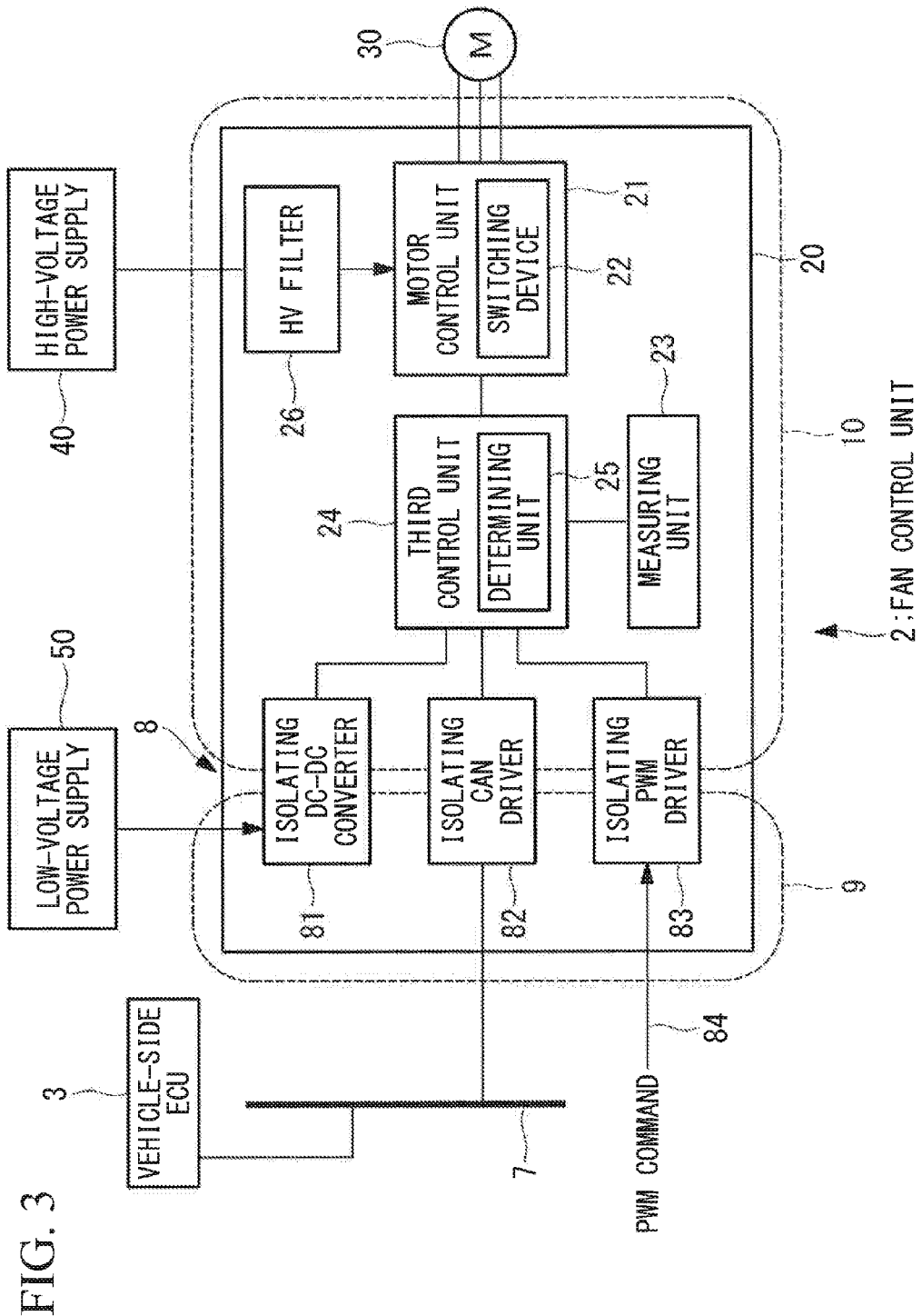
FIG. 3 is a functional block diagram of a fan control unit according to a modification of the first embodiment of the present invention.

In the embodiment described above, the air-conditioning-system ECU 4 controls the fan control unit 2 via the vehicle network CAN 7 in the case where the fan control unit 2 is in the normal state. However, the invention is not limited to this embodiment. For example, as shown in FIG. 3, in the case where the fan control unit 2 includes an isolating PWM driver 83 that operates by using electric power supplied from the low-voltage power supply 50 and that exercises PWM control in response to the duty to control the switching device 22 of the motor control unit 21, the air-conditioningsystem ECU 4 may control the rotation speed of the three-phase motor 30 by using PWM signals.

Specifically, the fan control unit 2 and the air-conditioning-system ECU 4 are connected to each other via a communication network 84 for transferring PWM signals that control the switching device 22 in the fan control unit 2 in response to the duty. Furthermore, the fan control unit 2 includes the PWM driver 83 that controls the switching device 22 of the motor control unit 21 based on PWM control and the CAN driver 82 that sends and receives information via the vehicle network CAN 7. The fan control unit 2 obtains a rotation-speed instruction for the three-phase motor 30 via at least one of the PWM driver 83 and the CAN driver 82.

If the fan control unit 2 and the air-conditioning-system ECU 4 are connected so that PWM signals can be transferred in addition to being connected to the vehicle network CAN 7 as described above, it is possible to utilize the air-conditioning-system hardware and software that have conventionally been used in vehicles. Furthermore, since the case of CAN communication is more robust against noise compared with the case where PWM signals are used, by using CAN communication, it is possible to provide an accurate rotation-speed instruction while suppressing the effect of noise.

Second Embodiment

Next, a second embodiment of the present invention will be described with reference to FIG. 4.

A control system according to this embodiment differs from the first embodiment described above in that a motor control unit receives electric power from a low-voltage power supply. The control system according to this embodiment will be described below mainly regarding the differences from the first embodiment, while omitting descriptions about the commonalities.

Figure 4:
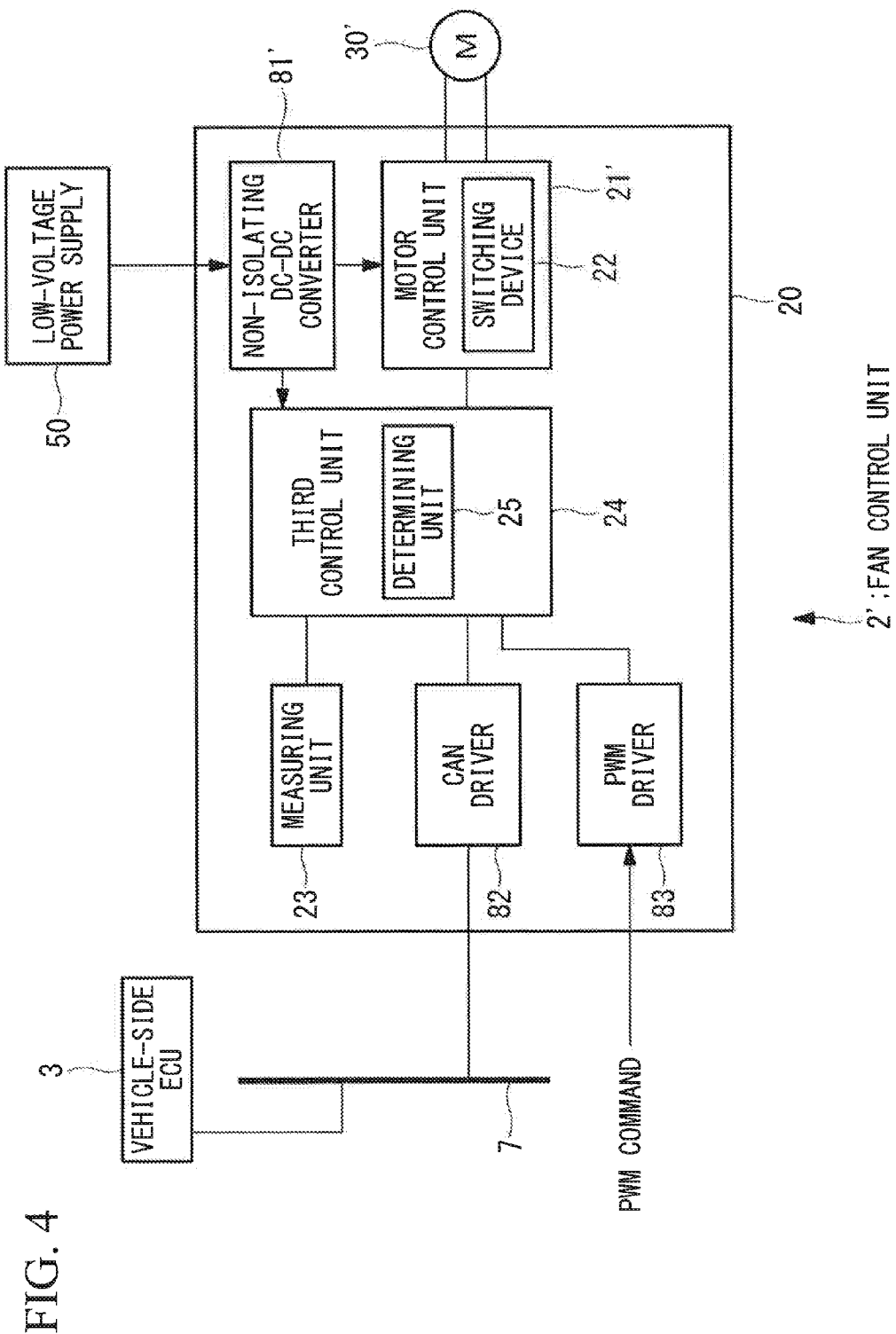
FIG. 4 is a functional block diagram of a fan control unit of a vehicle-cooling-fan control system according to a second embodiment of the present invention.

As shown in FIG. 4, a fan control unit 2' according to this embodiment includes a single-phase motor 30', a motor control unit 21', and the third control unit 24 and is connected to the vehicle network CAN 7, which is an internal vehicle network. Furthermore, the fan control unit 2' receives electric power from the low-voltage power supply 50, and the motor control unit 21' obtains electric power from the low-voltage power supply 50 via a non-isolating DC-DC converter 81' and supplies the electric power to the single-phase motor 30'. As described above, the electric power obtained from the low-voltage power supply 50 serves as a power supply for driving the single-phase motor 30'.

Also with the fan control unit 2', which uses the low-voltage power supply 50 for motor driving as described above, it is possible to detect a fault in the single-phase motor 30' from the vehicle side since the fan control unit 2' is connected to the vehicle-side ECU 3 via the vehicle network CAN 7. Furthermore, in the case where a fault having a high importance has occurred, the vehicle-side ECU 3 exercises control to protect the air-conditioning-system ECU 4 and the motor control unit 21. This makes it possible to prevent serious accidents and makes it easier to investigate the cause of the fault.

REFERENCE SIGNS LIST

1 Control system
2 Fan control unit
3 Vehicle-side ECU (first control unit)
4 Air-conditioning-system ECU (second control unit)
7 Vehicle network CAN (vehicle network)
8 Isolating unit
20 Inverter system
21 Motor control unit
22 Switching device
24 Third control unit
81 DC-DC converter
82 CAN driver (communication controller)
83 PWM driver (PWM controller)

The invention claimed is:

1. A vehicle-cooling-fan control system comprising a fan control unit having a motor control unit that controls a three-phase motor for driving a cooling fan to supply air to an on-board heat exchanger, a first control unit that is provided superordinate to the fan control unit and that controls a vehicle, and a second control unit that controls an air-conditioning apparatus of the vehicle,
  wherein the fan control unit, the first control unit, and the second control unit are connected to each other via a vehicle network so as to allow transfer of information therebetween,
  wherein the fan control unit outputs fault information via the vehicle network in a case where a fault has been detected at a switching device provided in the motor control unit, and
  wherein the first control unit exercises control via the vehicle network to protect the fan control unit and the second control unit in a case where the obtained fault information indicates a fault having a high importance.

2. A vehicle-cooling-fan control system according to claim 1, wherein the fan control unit is controlled via the vehicle network in a case where the second control unit is in a normal state, in which no serious fault has been detected.

3. A vehicle-cooling-fan control system according to claim 1,
  wherein the fan control unit and the second control unit are connected to each other via a communication network for transferring PWM (pulse width modulation) signals for controlling the switching device in the fan control unit in response to a duty, and
  wherein the fan control unit includes a PWM controller for controlling the switching device of the motor control unit via the communication network based on PWM control and a communication controller for sending and receiving information via the vehicle network, and the fan control unit obtains a rotation-speed instruction for the three-phase motor via at least one of the PWM controller and the communication controller.

4. A control method for a vehicle-cooling-fan control system, the control system including a fan control unit having a motor control unit that controls a three-phase motor for driving a cooling fan to supply air to an on-board heat exchanger, a first control unit that is provided superordinate to the fan control unit and that controls a vehicle, and a second control unit that controls an air-conditioning apparatus of the vehicle,
  wherein, in a case where the fan control unit, the first control unit, and the second control unit are connected to each other via a vehicle network so as to allow transfer of information therebetween,
  outputting, from the motor control unit, fault information via the vehicle network in a case where a fault has been detected at a switching device provided in the motor control unit, and
  controlling, by the first control unit, via the vehicle network to protect the fan control unit and the second control unit in a case where the fault information indicates a fault having a high importance.

5. A vehicle-cooling-fan control system according to claim 2,
wherein the fan control unit and the second control unit are connected to each other via a communication network for transferring PWM (pulse width modulation) signals for controlling the switching device in the fan control unit in response to a duty, and
wherein the fan control unit includes a PWM controller for controlling the switching device of the motor control unit via the communication network based on PWM control and a communication controller for sending and receiving information via the vehicle network, and the fan control unit obtains a rotation-speed instruction for the three-phase motor via at least one of the PWM controller and the communication controller.

* * * * *